April 10, 1928.  1,665,996

R. C. ADAMS ET AL

DEVICE FOR PROPAGATION OF CLAMS

Filed April 7, 1926

Ralph C. Adams.
Jonathan T. Adams.
INVENTORS

BY Victor J. Evans
ATTORNEY

Walter Chisard
WITNESS:

Patented Apr. 10, 1928.

1,665,996

UNITED STATES PATENT OFFICE.

RALPH C. ADAMS AND JONATHAN T. ADAMS, OF SOMERS POINT, NEW JERSEY, ASSIGNORS TO ADAMS ELSWORTH BIVALVE CO., OF MONTCLAIR, NEW JERSEY.

DEVICE FOR PROPAGATION OF CLAMS.

Application filed April 7, 1926. Serial No. 100,385.

This invention relates to means for propagating clams, and more particularly to a protective enclosure which is adapted to be placed in tide water for surrounding a plurality of matured clams, prior to the spawning season, and protect the resultant embryo clams during their shell acquiring period from their natural enemies, and from the wash of the tide during the propagation period thereof, on a natural submerged bed.

The principal object of the invention is to provide a suitable enclosure frame which is adapted to be placed in tide water with the sides of the frame of a sufficient height to extend either level with the surrounding water, above or below the level thereof, so that matured clams may be placed within said enclosure immediately prior to the spawning season, to protect the embryo clams during the shell acquiring period, from their natural enemies and from the natural wash of tide and undercurrents during the propagation period.

Another object of the invention is to provide an anchored enclosure in conjunction with natural beds under tide water, for the protection of embryo clams during their shell acquiring period, and until they have matured sufficiently to permit transplanting to larger natural beds.

Other objects of the invention will appear in the following detail description, and in the accompanying drawing, wherein:—

Figure 1:
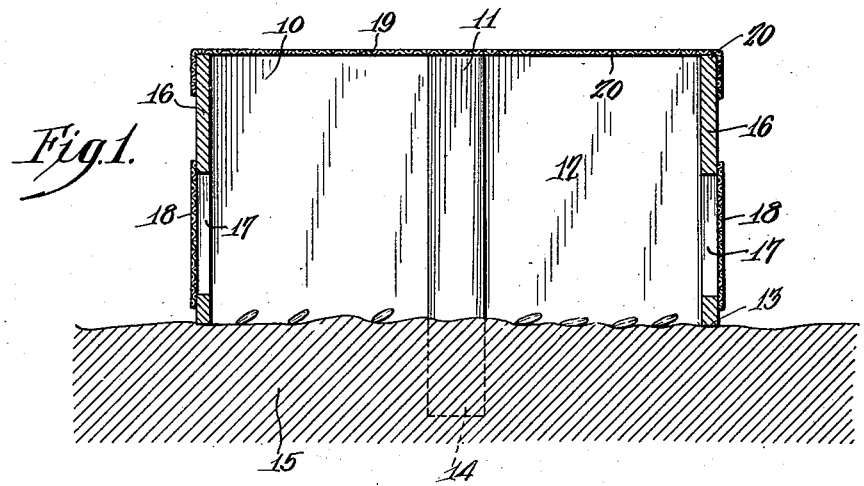
Figure 1 is a cross section thru the protective closure frame, submerged and anchored to a natural bed.
Figure 2:
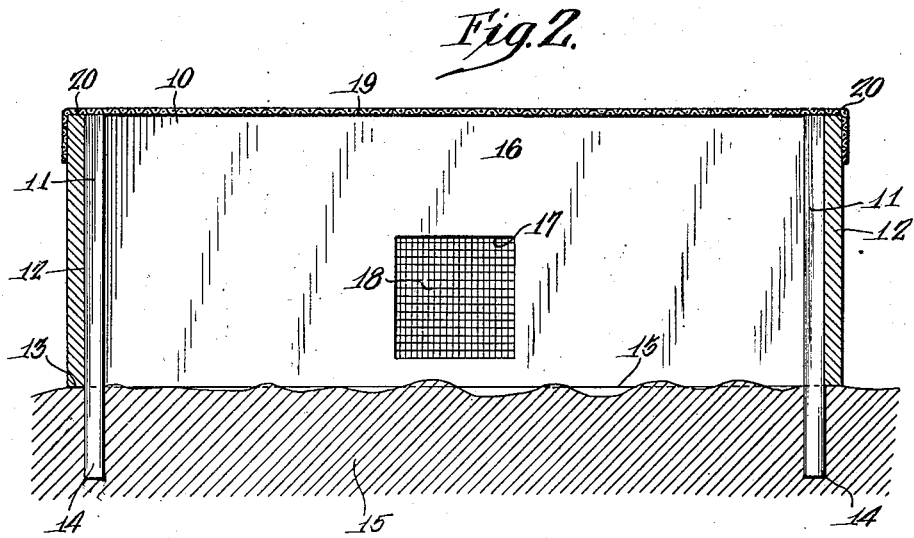
Figure 2 is a longitudinal section through the submerged closure frame showing the screened openings therein.

Referring more particularly to the drawing, the invention comprises a frame 10 which may be of any suitable size and configuration, and may be constructed of wood, or sheet metal. A suitable stake 11 is provided on each of the ends 12 of the frame 10. Each of said stakes 11 extends below the bottom edge 13 of the frame 10, to provide means for anchoring the said frame to a natural bed surface under tide water, by driving the lower ends 14 of the stakes 11 into the bed 15. The longitudinal side walls 16 of the frame 10 are each provided with an opening 17 adjacent the bottom edge 13 of the said frame and said openings are covered with a suitable mesh screen, burlap, or analogous material 18, to permit water and natural foods to enter the enclosure and provide a proper change of water and food for the clams. The screens 18 are further adapted to prevent the entrance into the enclosure of elements destructive to embryo clams, such as star-fish, snails, etc.

In order to retain the spats which are developed by the matured clams placed in the enclosure, it may also be desired to place a screen covering 19, such as wire mesh, burlap, and the like, over the top of the frame 10, and secure the same to the top edges 20 of the frame 10, so that the clam spats will not be washed away and scattered when floating about on the surface of the water before settling to the bottom. This method will retain the clam spats in the partially or entirely submerged enclosure frame, and permit the said clam spats to acquire a shell after settling to the bottom and while protected from their natural enemies, and the wash of the tide and undercurrents thereof.

In carrying out the process herein described, a suitable spot is first selected, then the bottom surface thereof is cleared by means of suitable rakes or the like, of any obstacles or natural clam enemies. A protective enclosure frame of appropriate size and material is then submerged and anchored at the point selected. Just prior to the spawning season, a plurality of matured clams are placed upon the bottom surface which represents a natural bed and allowed to remain therein until the spawning season is over. Upon the development of the resultant embryo clams to a stage where they can be handled, they are removed to larger natural beds for further development to maturity.

While we have shown and described means for clam propagation, it is to be understood that we do not limit ourselves to the exact features as herein set forth, but consider ourselves at liberty to make such changes and modifications, as fairly fall within the scope of the appended claim.

What we claim is:—

In the propagation of clams, a protecting structure for a natural bed comprising a plurality of stakes driven into the bed in upright positions and spaced a substantial distance apart substantially equal to the length of the bed, one at each end of the bed, end boards secured to and adjacent the outer faces of said stakes, side boards arranged in upright positions and secured to the ends of the end boards, thereby causing a rectangular enclosure to be constructed, a wire fabric top having depending side and end parts fitting down over the enclosure, the side boards having openings down and relatively close to the sides of the bed, and wire fabric closing said openings, said wire fabric covered openings and the wire fabric top, acting to permit water and natural food to easily enter the enclosure, without allowing the clam spats to be washed away or scattered.

In testimony whereof we affix our signatures.

RALPH C. ADAMS.
JONATHAN T. ADAMS.